(12) United States Patent
Lipson et al.

(10) Patent No.: US 9,819,435 B2
(45) Date of Patent: Nov. 14, 2017

(54) OPTICAL APPARATUS, METHOD, AND APPLICATIONS

(75) Inventors: Michal Lipson, Ithaca, NY (US);
Bernado Kyotoku, Joao Pessoa (BR);
Long Chen, North Brunswick, NJ (US)

(73) Assignee: CORNELL UNIVERSITY, Ithaca, NY (US)

( * ) Notice: Subject to any disclaimer, the term of this patent is extended or adjusted under 35 U.S.C. 154(b) by 468 days.

(21) Appl. No.: 13/213,666

(22) Filed: Aug. 19, 2011

(65) Prior Publication Data

US 2012/0177060 A1    Jul. 12, 2012

Related U.S. Application Data

(60) Provisional application No. 61/377,222, filed on Aug. 26, 2010.

(51) Int. Cl.
| | |
|---|---|
| G02B 6/34 | (2006.01) |
| H04J 14/02 | (2006.01) |
| G02B 6/12 | (2006.01) |
| G02B 6/293 | (2006.01) |

(52) U.S. Cl.
CPC .......... *H04J 14/02* (2013.01); *G02B 6/12007* (2013.01); *G02B 6/2931* (2013.01); *G02B 6/29307* (2013.01); *G02B 6/29308* (2013.01); *H04J 14/0201* (2013.01)

(58) Field of Classification Search
CPC .... G02B 6/4214; G02B 6/262; G02B 6/4298; G02B 6/4206; G02B 6/2817; G02B 6/124; G02B 6/02085; G02B 6/12007; G02B 6/02138; G02B 6/022

USPC ................................................. 385/31, 37
See application file for complete search history.

(56) References Cited

U.S. PATENT DOCUMENTS

| | | | |
|---|---|---|---|
| 6,636,668 B1 | 10/2003 | Al-Hemyari et al. | |
| 6,643,421 B1* | 11/2003 | Chin et al. ....................... | 385/15 |
| 2005/0008295 A1* | 1/2005 | Grunnet-Jepsen et al. ..... | 385/37 |
| 2007/0041683 A1* | 2/2007 | Keyworth ........................ | 385/24 |
| 2007/0086699 A1* | 4/2007 | Doerr ............................... | 385/24 |

(Continued)

OTHER PUBLICATIONS

Nolte et al.; Femtosecond waveguide writing: a new avenue to three-dimensional integrated optics; Applied Physics A, Materials Science & Processing, Institute of Applied Physics, A 77; 109-111 (2003).

(Continued)

*Primary Examiner* — Jerry Blevins
(74) *Attorney, Agent, or Firm* — William Greener; Alek P. Szecsy; Bond Schoeneck & King, PLLC

(57) ABSTRACT

A high resolution, wide spectral range, optical apparatus that includes an optical resonator cavity and a wavelength demultiplexer, arrangeable in multiple configurations. A method for increasing the resolution of a wavelength demultiplexer involves inputting light into an optical resonant cavity; inputting a plurality of different resonant output wavelengths to a wavelength demultiplexer; and routing each different resonant wavelength to a different output waveguide of the demultiplexer to generate a demultiplexer output spectrum. The method further involves performing either a time serialization or a space serialization procedure to increase the channel density and fully cover the spectrum of interest.

21 Claims, 10 Drawing Sheets

(56) References Cited

U.S. PATENT DOCUMENTS

2010/0322555 A1* 12/2010 Vermeulen ......... G02B 6/12007
                     385/28

OTHER PUBLICATIONS

Xu et al.; Micrometre-scale silicon electro-optic modulator; vol. 435, May 19, 2005, Nature Publishing Group; 325-327.

* cited by examiner

OPTICAL APPARATUS, METHOD, AND APPLICATIONS

CROSS-REFERENCE TO RELATED APPLICATIONS

The instant application claims priority to U.S. Provisional Application No. 61/377,222 filed on Aug. 26, 2010, the subject matter of which is incorporated herein by reference in its entirety.

GOVERNMENT FUNDING

This invention was made with government support under Award No. W911NF-07-1-0668 awarded by the Army Research Office. The government has certain rights in the invention.

BACKGROUND OF THE INVENTION

1. Field of the Invention

Embodiments of invention generally relate to optical apparatus, methods, and applications thereof and, more particularly to optical apparatus including an optical resonant cavity combined with a wavelength demultiplexer, for e.g. but not limited to, resolution-enhanced spectrometers, light compositors, and wavelength-division multiplexing devices, and associated methods and applications.

2. Description of the Related Art

Several difficulties arise in the design of high resolution, wide range, and small footprint spectrometers. Designs such as etched diffraction gratings and arrayed waveguide gratings (AWGs) are limited in resolution by the number of grooves/waveguides. Since the size of the whole spectrometer needs to increase in order to accommodate more grooves/waveguides, the area of the device increases with the square of the resolution improvement. An AWG generally employs high order diffraction to improve its resolution, but since it comes with the cost of decreasing free spectral range (FSR) and thus decreasing spectral range available, this is not a particularly helpful solution.

Spectrometers employing an array of ring resonators have also been reported. In this case, high resolution with a small device area can be achieved, but due to fabrication limitations each ring resonator requires individual tuning, which increases the complexity of the system. Also, serial cascading of a very large number of ring resonators has the problem of optical attenuation since each ring has a finite insertion loss.

The inventors have thus recognized the benefits and advantages to be obtained from an optical apparatus such as, but not limited to, a spectrometer, having high resolution, wide spectral range, a small footprint, versatile materials platforms including CMOS assembly compatibility, that is suitable particularly but not solely for applications in chemical and biological sensing, optical metrology, and optical coherence tomography.

SUMMARY

An embodiment of the invention is a high resolution, wide spectral range spectrometer apparatus that includes an optical resonator cavity and a wavelength demultiplexer. The cavity generates a wavelength comb of sharp resonances that are then coupled into the demultiplexer and spatially separated, achieving effective resolution considerably higher than the resolution of the demultiplexer alone. In an exemplary aspect, the spectrometer apparatus demonstrated a channel spacing of 0.1 nm with more than 100 channels and a footprint of 2 $mm^2$.

An embodiment of the invention is directed to an optical apparatus that includes an optical resonant cavity having an input, an output, wherein multiple wavelengths that are matched to the cavity resonances and separated by a free spectral range (FSR) can be transmitted from the input to the output, and a through port; and a wavelength demultiplexer having an input and a plurality of outputs, wherein the optical resonant cavity output is coupled to the demultiplexer input, further wherein the demultiplexer outputs are characterized by a channel spacing that is closely matched to the free spectral range of the optical resonant cavity. In various non-limiting aspects:

the optical resonant cavity can be a microring resonator, a microdisk resonator, a racetrack resonator, a microtoroidal resonator, a photonic crystal cavity, including multiples of any of the resonator structures;

the demultiplexer can be a planar grating;

the planar grating can be an echelle grating;

the planar grating can be an arrayed waveguide grating;

the demultiplexer can be a photonic crystal or a metamaterial;

the plurality of demultiplexer outputs are coupled to either an array of optical waveguides or an array of photodetectors;

the optical resonant cavity can be tunable such that the cavity resonance wavelengths are tunable over a tuning range;

the demultiplexer output is characterized by an optical bandwidth that is either approximately equal to the tuning range of the cavity resonance wavelengths, or is tunable to cover the tuning range of the cavity resonance wavelengths;

the optical resonant cavity and the wavelength demultiplexer are integrally disposed as a planar photonic circuit on a material platform such as, but not limited to, silicon, indium phosphide, and gallium arsenide;

the apparatus further includes two or more of the apparatus disposed in serial connection, wherein the through port of the optical resonant cavity of an immediately preceding apparatus is coupled to an input of the optical resonant cavity of an immediately succeeding apparatus;

each of the plurality of the optical resonant cavities has a substantially similar FSR but slightly different resonant wavelengths (as one skilled in the art would understand by 'substantially similar' and 'slightly different') and the channel spacing of each respective demultiplexer is matched to the FSR of its associated optical resonant cavity;

the number of apparatus, n, are determined by n≈FSR/Δλ, where Δλ is the difference in the resonant wavelengths between one apparatus and an immediately adjacent apparatus.

An embodiment of the invention is directed to a method for increasing the resolution of a wavelength demultiplexer. The method involves the steps of a) inputting light into an optical resonant cavity having an input and an output, and generating a plurality of different resonant output wavelengths in an output transmission spectrum of the optical resonant cavity; and b) inputting the plurality of different resonant output wavelengths to a wavelength demultiplexer, and routing each different resonant wavelength to a different output waveguide of the demultiplexer to generate a demultiplexer output spectrum, wherein a free spectral range (FSR) of the optical resonant cavity is substantially equal to a wavelength channel spacing (Δλ) of the demultiplexer. In various, non-limiting aspects, the method further involves:

performing either a time serialization or a space serialization procedure;

wherein the time serialization further involves i) measuring the demultiplexer output spectrum; ii) shifting the resonant wavelengths of the optical resonant cavity by an amount $\Delta\lambda$; iii) measuring a new demultiplexer output spectrum; and iv) repeating steps (ii-iii) n times to cover a spectrum of interest;

wherein n≈FSR/$\Delta\lambda$, where FSR is the free spectral range of the optical resonant cavity;

wherein the space serialization further involves providing a plurality of optical resonant cavities that are connected in series, wherein each of the optical resonant cavities has a different group of resonance wavelengths separated by an amount $\Delta\lambda$, further wherein each of the optical resonant cavities has an input port, a drop port, and a through port, wherein the through port of each optical resonant cavity is coupled to the input port of an immediately subsequent optical resonant cavity;

further, providing n≈FSR/$\Delta\lambda$ optical resonant cavities, where FSR is the free spectral range of the optical resonant cavities; generating a drop port transmission spectrum containing a plurality of resonant output wavelengths from each of the plurality of optical resonant cavities; inputting the drop port transmission of each resonant cavity into a wavelength demultiplexer and routing each different resonant wavelength to a different output waveguide of the demultiplexer; and assembling the transmission from all output waveguides of all demultiplexers to generate the spectrum of the original input signal.

BRIEF DESCRIPTION OF THE DRAWINGS

The present invention will be more fully understood and appreciated by reading the Detailed Description of Exemplary Embodiments of the Invention, set forth below, in conjunction with the accompanying drawings, in which.

DETAILED DESCRIPTION OF EXEMPLARY EMBODIMENTS

Figure 1:
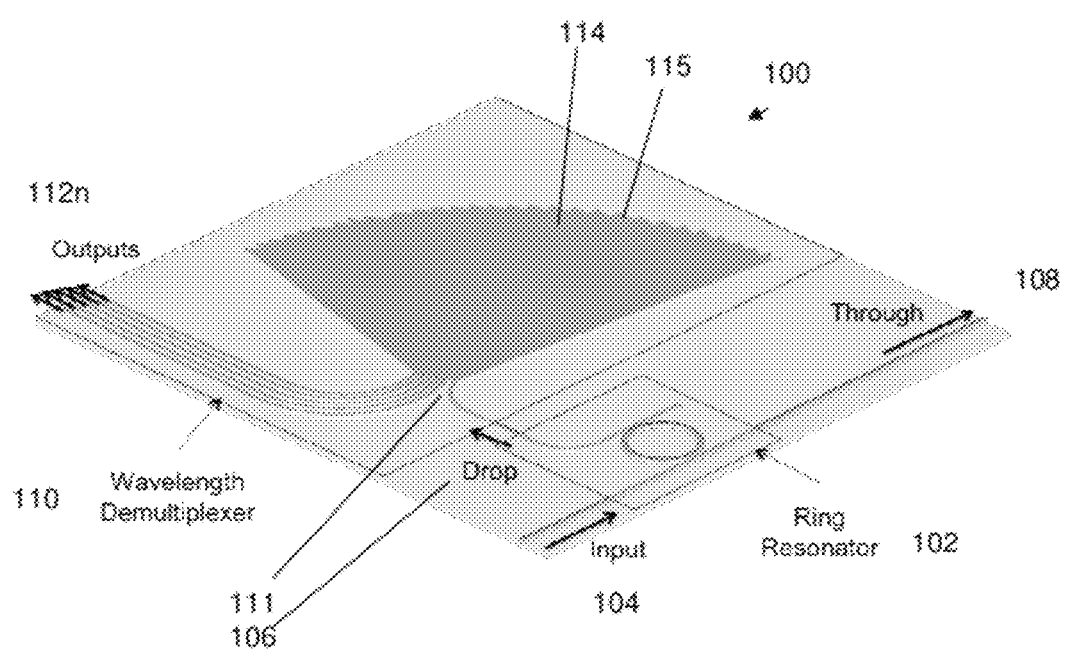
FIG. 1: Example of a cavity-enhanced spectrometer, including a ring resonator filter and a diffraction grating based wavelength demultiplexer. The dark gray structure represents high refraction index material; the light grey base is low refraction index material, according to an illustrative embodiment of the invention.

FIG. 1 illustrates an exemplary high resolution, wide spectral range spectrometer apparatus 100. The apparatus includes an optical resonant cavity 102 in the form of a ring resonator including an input 104, an output 106 in the form of a drop-port, and a through port 108. The apparatus 100 further includes a wavelength demultiplexer 110 in the form of a diffraction grating 114 having an input 111 that is coupled to the drop-port 106 of the ring resonator, and a plurality of outputs 112$_n$ (here, e.g., n=5).

As is illustrated in FIG. 1, the optical resonant cavity 102 and the wavelength demultiplexer 110 are formed and located as separate components that are formed and located over a substrate.

Multiple resonator input wavelengths that are matched to the ring cavity resonances and which are separated by a free spectral range (FSR) can be transmitted from the input 104 to the output 106. The plurality of demultiplexer outputs 112$_n$ have a channel spacing that is closely matched to the FSR of the optical resonant cavity. The wavelength demultiplexer 110 is in the form of a diffraction grating 114.

Figure 2:
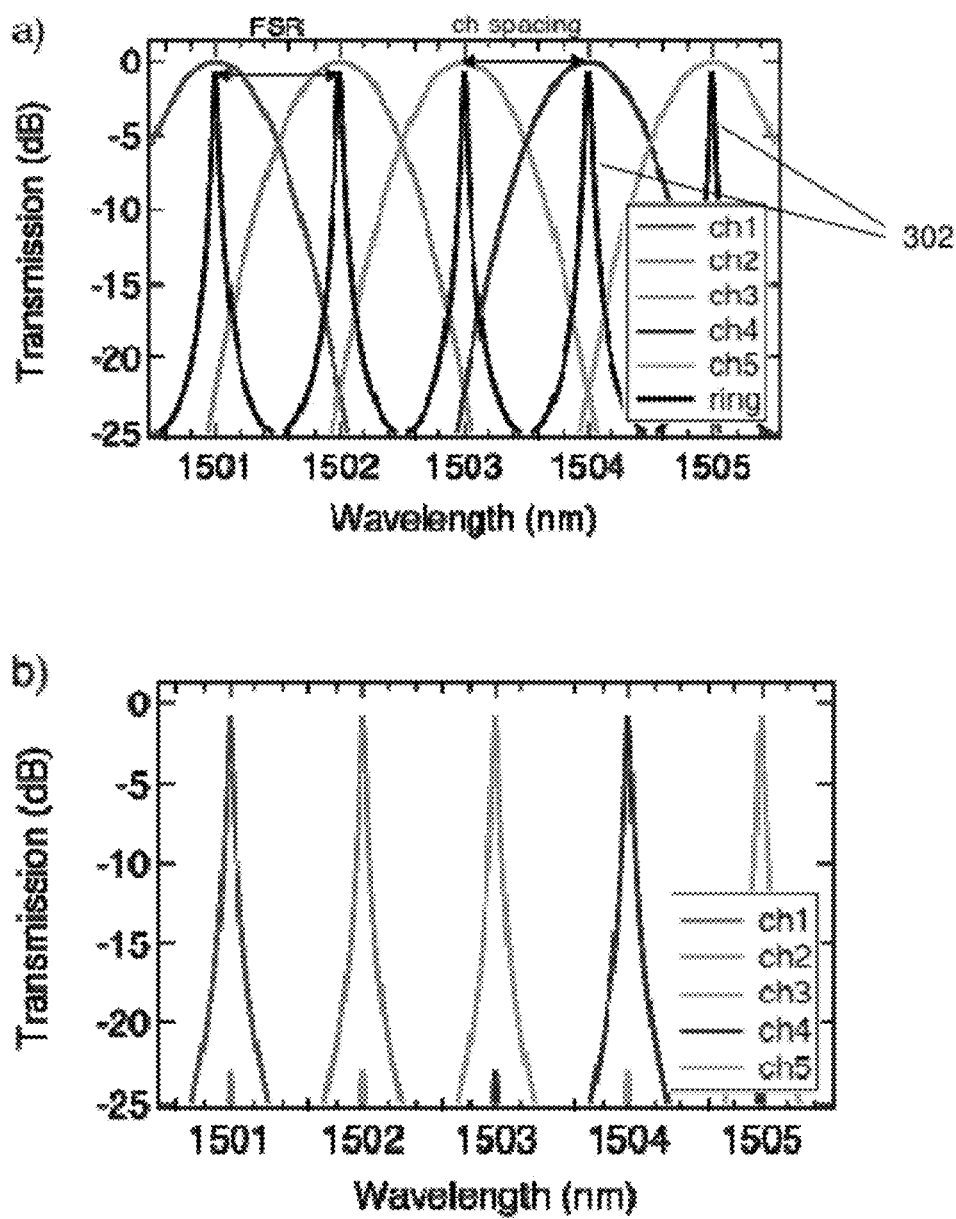
FIG. 2: *a*) Transmission spectrum of ring resonator input to drop port and transmission spectra of grating demultiplexer for different channels; *b*) Transmission spectrum for the combined device; according to an illustrative aspect of the invention.

In operation, light is launched into the input 104 of the ring resonator 102, which acts to pre-filter the light to be analyzed by the diffraction grating 114. As illustrated in FIG. 2*a*, the resonator will transmit to the drop port a wavelength comb 302 of very narrow width resonances whose wavelengths are matched to the ring resonances and whose spacing is equal to the resonator FSR (labeled as "FSR"). This filtered optical signal then propagates from the drop port to the diffraction grating input. At this point, the light then leaves the waveguide, diffracts out towards the grating teeth 115, and is reflected back towards the plurality of demultiplexer outputs 112$_n$. These outputs have broad transmission passbands that are spectrally aligned with the wavelength comb, and have a channel spacing (labeled as "ch spacing" in FIG. 2*a*) that is closely matched to the comb spacing (i.e., the resonator FSR). As a result, the demultiplexer spatially separates the individual resonances in the wavelength comb 302 and routes each to one of the distinct waveguides 112$_n$, as shown in FIG. 2*b*. Note that the grating passbands are noticeably wider than the cavity resonances. In a particular aspect, the passbands are wide and box-shaped so that the wavelength comb 302 is spatially separated by the diffraction grating with little impairment. As shown in FIG. 2*b*, the effective resolution of the whole device (in terms of the final spectral width at the output waveguides), is now set by the ring cavity resonance widths instead of the demultiplexer. As the cavity resonance width is mainly determined by the propagation loss inside the cavity and can be as small as 0.001 nm even for a very compact resonator (for example, less than 100 micrometers in diameter), this in principle enables spectrometers with extremely high resolutions without significant increase in the device footprints.

An embodied invention as presented herein, i.e., using a combination of a resonant cavity and a wavelength demultiplexer to enhance the resolution, can be implemented in various ways. For example, the apparatus can be implemented using discrete components, fibers, or planar integrated photonic circuits on various material platforms such as silicon, indium phosphide, gallium arsenide, etc. The ring resonator 102 in FIG. 1 can be replaced by many other forms of resonators such as a disk, a racetrack, a microsphere resonator, and others known in the art. The diffraction grating 114 in FIG. 1 can be a free-space grating, a prism, an integrated concave grating, an arrayed waveguide grating, etc. The output waveguides of the diffraction grating can be free-space optical paths, fibers, or planar waveguides. The outputs can be coupled to an array of waveguides or to an array of photodetectors. A person skilled in the art can arrange an apparatus with different components but still falls within the scope of this invention.

Increasing Channel Density

The apparatus in FIG. 1 generates multiple outputs, each of which contains a high resolution peak from one of the cavity resonances as shown in FIG. 2b. These peaks cover only a small portion of the spectrum of interest, and for many applications a higher spectral or channel density is desired. This can be done by serializing the apparatus in FIG. 1 either spatially or temporally.

Figure 3:
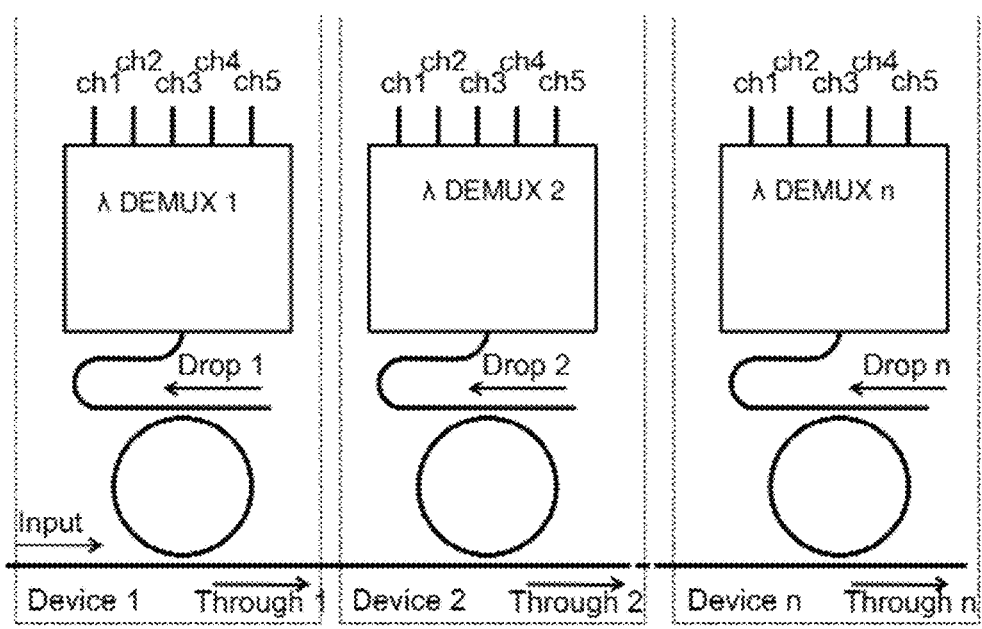
FIG. 3: Schematic diagram of a space serialized apparatus for increasing channel density, according to an illustrative aspect of the invention.

The space serialization approach consists of using multiple copies of the apparatus shown in FIG. 1, each named as a device. The input of one device is connected to the through port of the previous device, as shown in FIG. 3. The response at the drop 1 and the final outputs of the device 1 (labeled as "ch1" to "ch5") are similar to the ones shown in FIG. 2.

Figure 4:
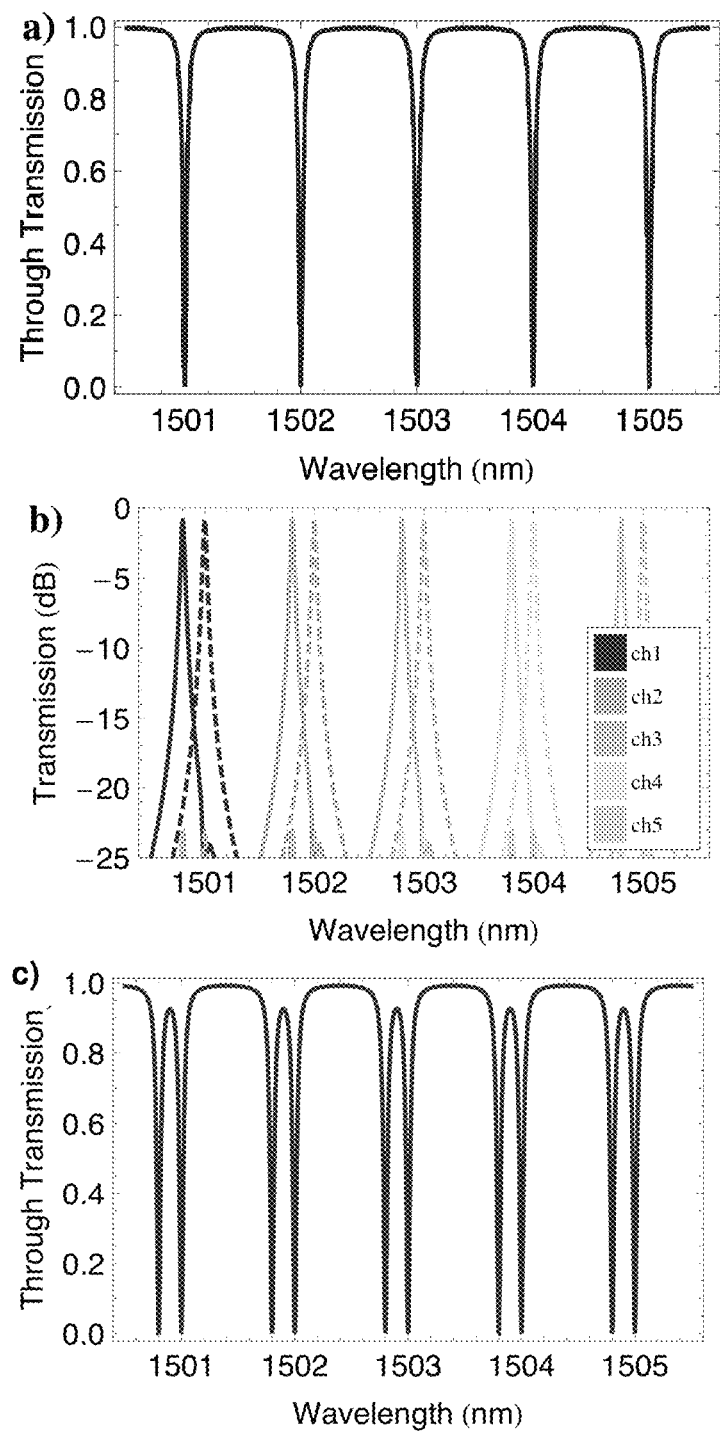
FIG. 4: *a*) Spectrum of the through port 1 of FIG. 3; *b*) Transmission spectrum of device 2 output channels, in comparison with that of device 1 output channels in the dashed line; *c*) Spectrum of the through port 2, according to an illustrative aspect of the invention.

FIG. 4(a) shows the transmission spectrum of the through port of device 1. As can be seen, all light that was routed to drop 1 is missing, and all the rest is transmitted to the through port 1, and is used as an input to device 2. Device 2 is designed or tuned such that its transmission spectrum is equivalent to that of device 1 but with wavelengths shifted by an amount $\Delta\lambda$. This requires that the cavity resonances in device 2 still have a similar FSR as in device 1, but have slightly shifted resonant wavelengths. The demultiplexer in device 2 also needs ensure proper transmission of the slightly shifted wavelength combs generated by the resonator. FIG. 4(b) shows the output responses (labeled as "ch1" to "ch5") of device 2 in solid lines, in comparison with the output responses of device 1 in dashed lines. One can see that device 2 generates outputs whose wavelengths are reduced by about 0.2 nm from those of device 1. FIG. 4(c) shows the through port 2 transmission spectrum, where it can be seen that light that was routed to the drop ports of devices 1 and 2 are missing. So sequentially, each device picks up some light out of the spectrum that is left untouched by the preceding devices, and sends the remaining spectrum to the subsequent device.

Figure 5:
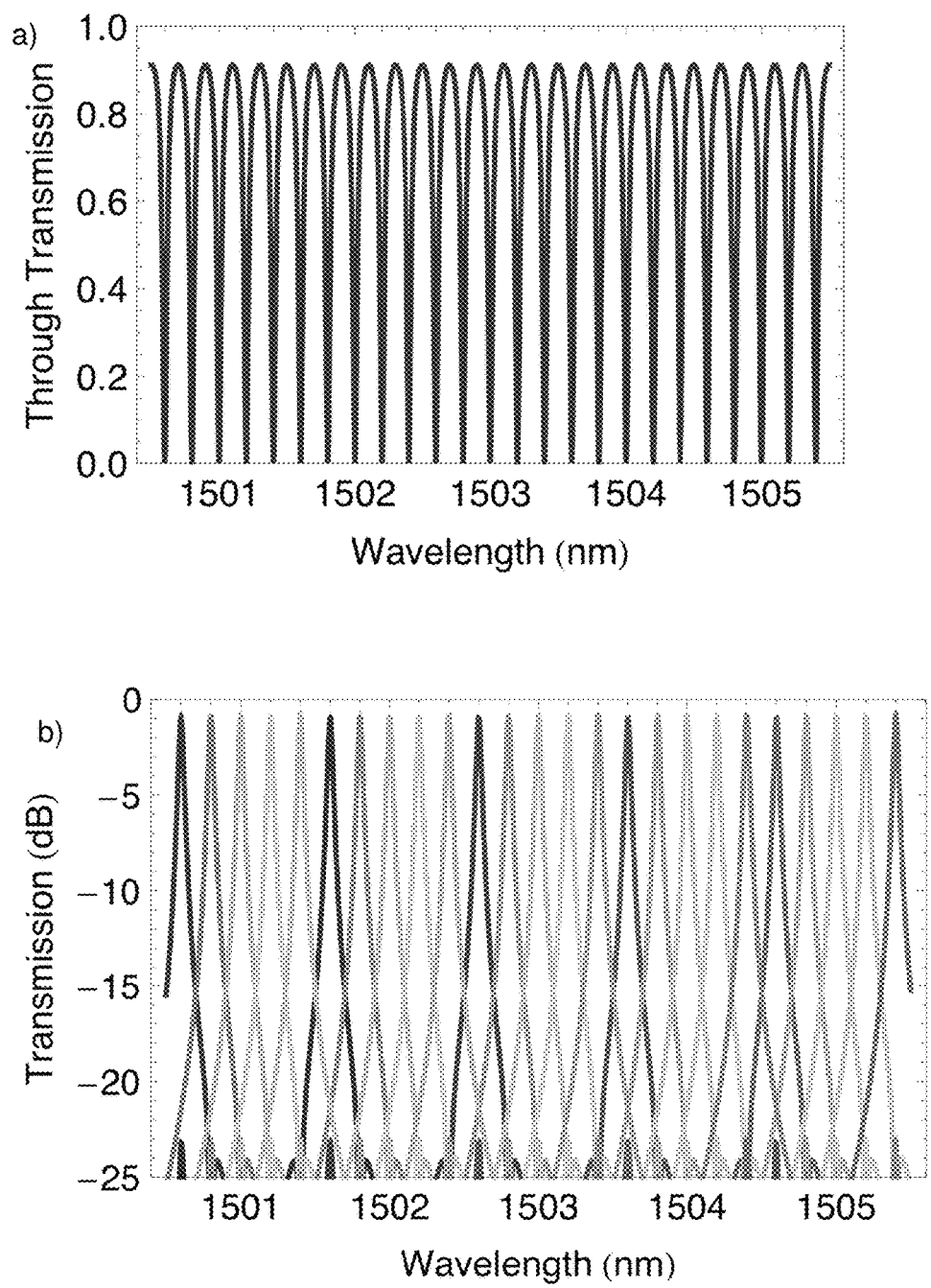
FIG. 5: *a*) Spectrum of the through port of the last device of FIG. 3; (*b*) Spectrum of all channels in all devices after spatial serialization, according to an illustrative aspect of the invention.

In FIG. 5(a), the transmission spectrum of the through port of the last device is shown. The light that is missing in this spectrum has been routed to the output channels of different devices, and the spectra of these output channels are shown in FIG. 5(b).

To cover the entire FSR evenly with a wavelength step of $\Delta\lambda$, the number of devices necessary in this configuration is FSR/$\Delta\lambda$. In spite of the area increase (over the time serialization approach described below), this approach is more compact than using a traditional demultiplexer alone to achieve comparable wavelength resolution, since the area here increases linearly with resolution as opposed to quadratically as in traditional demultiplexers.

This approach is particularly advantageous for applications where time is critical, such as Optical Coherence Tomography (OCT) and in Ultra Fast Oscilloscopes, or where the signal cannot be temporally serialized such as a time-dependent signal, for example, a short pulse.

Figure 6:
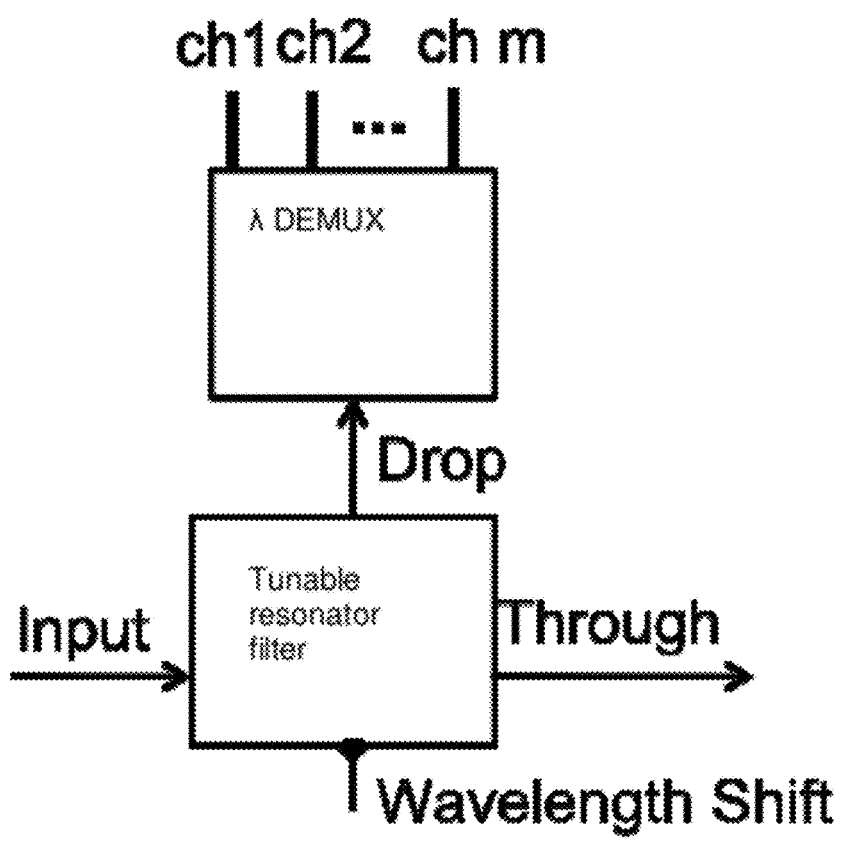
FIG. 6: Schematic diagram of a time serialized apparatus for increasing channel density, according to an illustrative aspect of the invention.

A time serialization approach is illustrated with reference to FIG. 6. This technique requires that the wavelengths of the resonator resonances are actively tunable, and the demultiplexer passbands can accommodate the wavelength tuning range. Alternatively, in the case that the demultiplexer passbands are relatively narrow compared to the wavelength tuning range, the demultiplexer passbands can be tuned to track the filter wavelengths and ensure minimum impairment from the demultiplexer. The tuning range of the resonator should be at least close to the demultiplexer channel spacing to ensure full spectral coverage (as one skilled in the art would understand). The tuning can be done using various mechanisms such as thermo-optical, mechanical, and electro-optical effects, for example.

Figure 7:
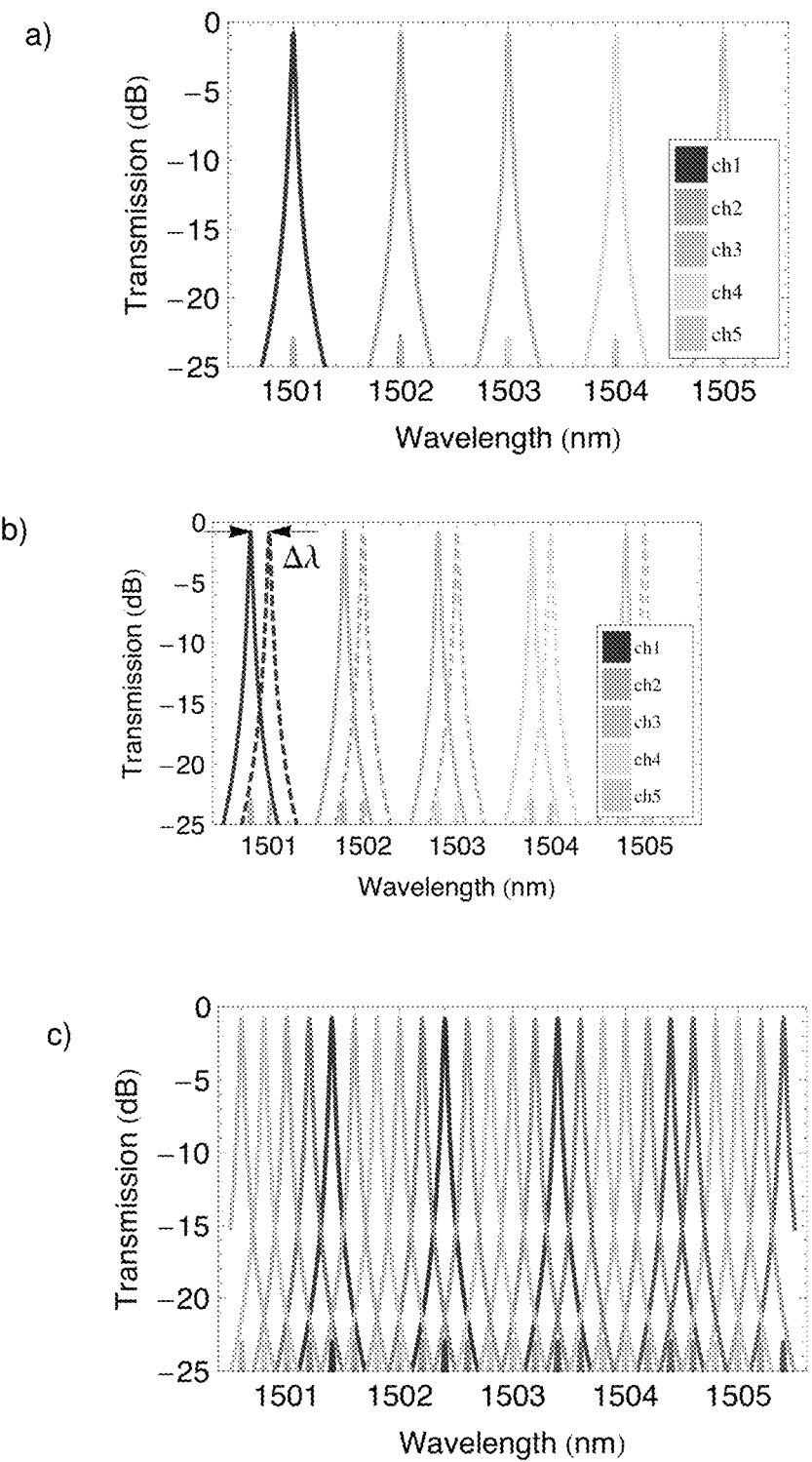
FIG. 7: (*a*) Spectrum of the output channels from the first measurement; (*b*) Spectrum of the output channels from the second measurement (solid lines) after a wavelength shift of $\Delta\lambda$, in comparison to that from the first measurement shown in dashed lines; (*c*) Assembled spectrum of the output channels from all measurements after time serialization, according to an illustrative aspect of the invention.

The time serialization process involves first, measuring the light transmitted by the composed device, which would result in a transmission spectrum shown in FIG. 7(a). Then the resonance wavelengths (and in some instances, the transmission passband of the demultiplexer as well, if needed) are shifted by an amount $\Delta\lambda$, and the transmitted light is measured again. FIG. 7(b) shows the transmission spectrum for the shifted device (continuous line) and the not shifted (dashed line). This process is repeated FSR/$\Delta\lambda$ times, and all of the collected data (N outputs multiplied by FSR/$\Delta\lambda$) are assembled to generate a transmission spectrum equivalent of a spectrometer with channel spacing $\Delta\lambda$. The resulting transmission spectrum is showed in FIG. 7(c).

In general terms, when designing a ring resonator filter, for a given waveguide intrinsic loss a compromise must be made between the resonance width and the peak efficiency in which the light power is transmitted from the input to the drop port (drop efficiency). The resonance width $\Delta\lambda_{FWHM}$ dependence on the drop efficiency η is given by $$\Delta\lambda_{FWHM} = (\lambda^2 \pi n_g L)[(\tau - (\tau\eta)^{1/2}/1 - (\tau\eta)^{1/2})^{1/2} - (\tau - (\tau\eta)^{1/2}1 - (\tau\eta)^{1/2})^{-1/2}] \quad (1)$$

where $\tau = 10^{-\alpha L/20}$ is the resonator round trip amplitude efficiency, α, L and $n_g$ are the ring resonator waveguide loss, length, and group index, respectively, and λ is the resonance wavelength. The coupling of the input and drop waveguides to the cavity may be assumed to be symmetric. In such a configuration, the input port to drop port loss as well as the resonance width is minimum. The resonance width $\Delta\lambda$ is directly related to the loss (assuming losses of 1-2 dB/cm routinely achieved in silicon waveguides).

Illustrative Example

We designed a diffraction grating (DG) spectrometer using the Rowland architecture. To reduce spherical aberration, a non-uniform groove spacing was employed. Metal heaters were added above the silicon layer to align the resonator and spectrometer transmission combs using the thermo-optic effect in silicon. The grating demultiplexer contained 25 channels with spacing of 1 nm. To match the ring resonator FSR to the DG spectrometer channel spacing we used an 83.5 µm radius ring with waveguide cross-section of 450×250 nm. The FSR changes with wavelength according to $\lambda^2/n_g L$, but considering a slightly positive group velocity dispersion ($\delta n_g/\delta\lambda \approx 3.6\times10^{-3}$ nm$^{-1}$), this change is extremely small: the total change in FSR across the range of operation (25 nm) is approximately 1% for light polarized in the plane of the device (TE polarization).

We fabricated the device using a CMOS compatible process. We started with a silicon-on-insulator (SOI) wafer with a 250 nm top silicon layer and a 3 µm buried oxide layer. A 60 nm layer of SiO$_2$ was deposited using high-temperature, low-pressure chemical vapor deposition (HTO) to be used as a hard mask. The grating, ring, and waveguides were defined by e-beam lithography on a PMMA resist mask. The pattern was transferred to the oxide layer using a CHF$_3$/O$_2$ reactive ion etch (RIE). The silicon layer was etched using chlorine RIE. A layer of 160 nm of SiO$_2$ was deposited using HTO to conformally fill the 100 nm gaps in the waveguide-to-ring coupling, then 1 µm of SiO$_2$ was deposited using plasma enhanced chemical vapor deposition to clad the device. We defined the heaters using photolithography (using SPR955CM and LOR5A resists) and then deposited a NiCr film. After liftoff, the wafer was diced and polished for optical testing.

We measured the device transmission spectrum by coupling laser light from a tunable laser into the input waveguide using a lensed fiber and measuring the transmitted power as a function of wavelength. The input light was TE polarized and the output light was collected using a microscope objective and filtered for the TE polarization before detection.

We achieved a channel FWHM of 0.05 nm across 10 different channels of the composed ring and echelle diffraction grating (EDG) spectrometer, which represents a decrease in the channel width by 10 times compared with the DG spectrometer alone. This channel width corresponds to a quality factor of Q=$\lambda/\Delta\lambda$=30,000.

Figure 8:
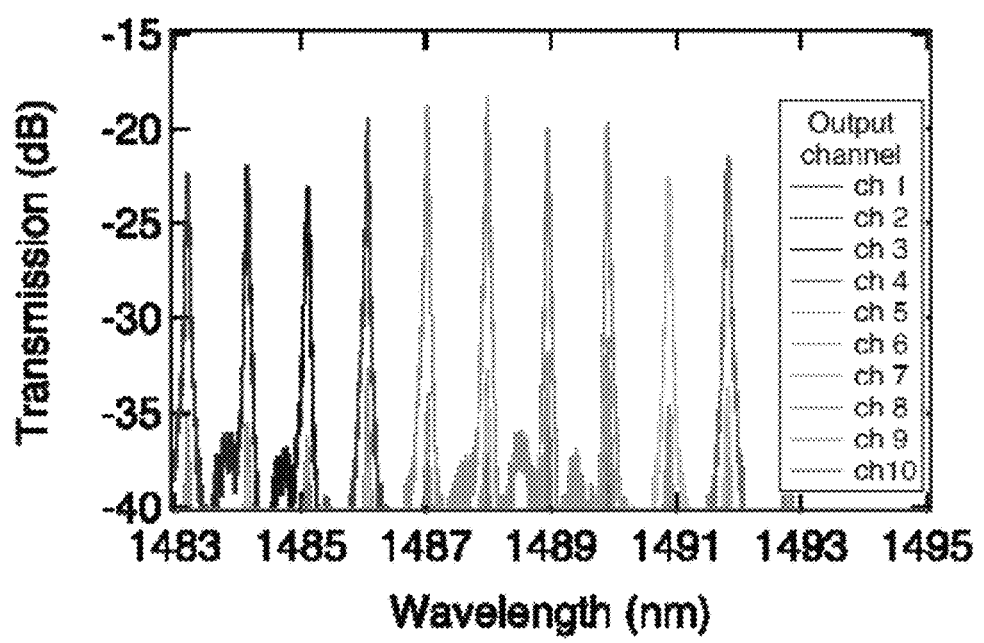
FIG. 8: Transmission spectrum of a device according to an illustrative, exemplary embodiment of the invention.

FIG. 8 shows the device transmission. The transmission is normalized to the ring through port power level to eliminate coupling losses. The device insertion loss varied between −18 and −23 dB, where −10 dB is due to the Fresnel reflection of the diffraction grating and can be eliminated by coating it with a metal or using Bragg reflectors. Other losses were attributed to stitching in the waveguide definition during e-beam lithography.

An exemplary device application of the embodied invention is a standard spectrometer. Because it is made on-chip, detectors may be integrated in the end of the spectrometer output. Furthermore, all the electronic circuit necessary to process the detected signal to a desired end may be built in the same chip, leaving as an output an easily usable electronic signal.

Figure 9:
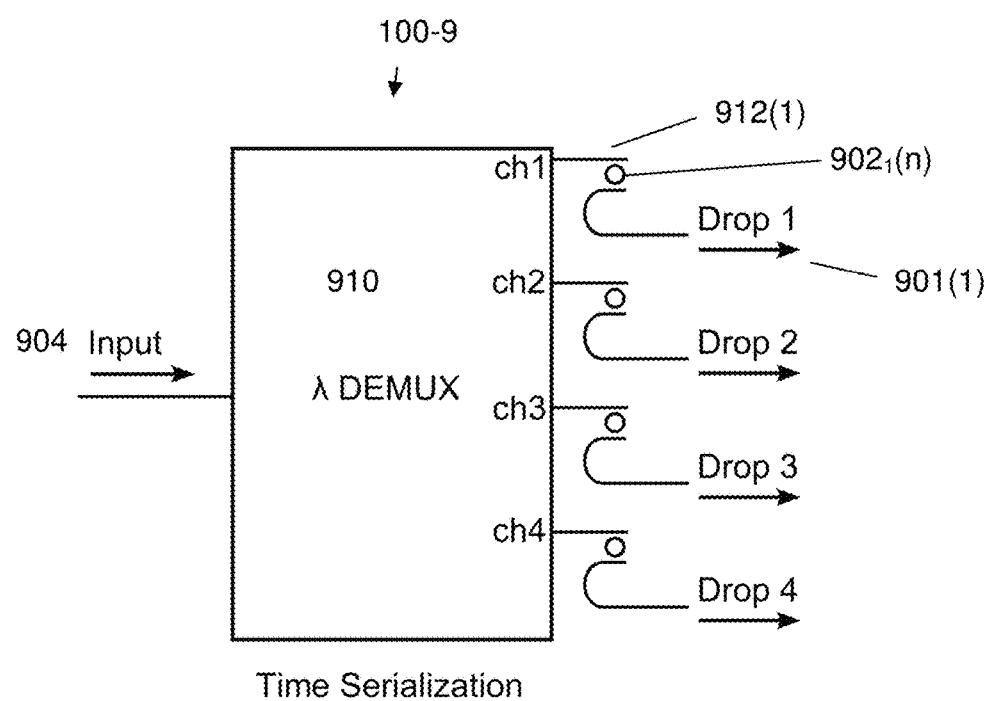
FIG. 9 schematically illustrates a time-serialization-based apparatus according to an exemplary embodiment of the invention.
Figure 10:
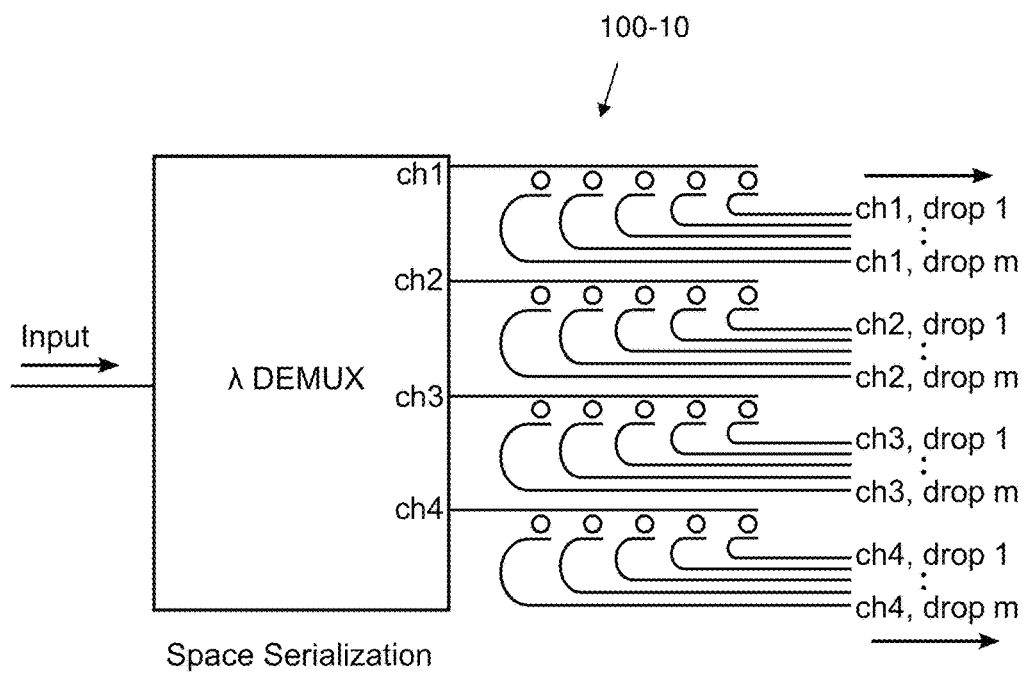
FIG. 10 schematically illustrates a space-serialization-based apparatus according to an exemplary embodiment of the invention.

It will be appreciated by those skilled in the art that the structure of the apparatus may be reversed while still achieving the goal of increasing the wavelength demultiplexer (WDM) resolution. In the exemplary embodiments illustrated in FIGS. 9 and 10, light is first input at 904 to a wavelength demultiplexer component 910 where the light is coarsely separated into several relatively broad spectral channels ch(n) (of width $\Delta\lambda_{WDM}$) that are captured by output waveguides 912(n), and one or more resonators 902$_m$(n) are coupled to each of these output waveguides to decrease the spectral width of the WDM to the resonator linewidth $\Delta\lambda_{FWHM}$. In this aspect, the WDM grating (not shown in FIGS. 9, 10) pre-filters the light into several relatively broad channels, and then the resonators on each waveguide output operate to filter the light into narrower channels 901(n), which can then be measured with detectors. With this geometry, fabrication is simplified over the earlier described embodiments by eliminating the requirement that the FSR of the resonant cavity substantially match the channel spacing of the demultiplexer. Rather, the FSR of the resonators should be equal to or greater than the WDM channel spacing, i.e., FSR>$\Delta\lambda_{WDM}$, to ensure that only one resonator propagates light at a specific wavelength. This embodiment (100-9) can be used with one resonator per WDM output waveguide in a time-serialization approach as illustrated in FIG. 9). A multiple resonators per WDM output waveguide embodiment 100-10 can be used in a space-serialization approach as illustrated in FIG. 10. To enable detection across the entire demultiplexer channel width in the space-serialization approach, the number, m, of resonators on each WDM output waveguide will advantageously be equal to or greater than the WDM channel width divided by the final channel spacing, i.e., m≥$\Delta\lambda_{WDM}/\Delta\lambda$. Additionally, to reduce crosstalk, the resonant wavelengths of adjacent resonators will advantageously be separated by an amount $\Delta\lambda$ approximately equal to or greater than the linewidth of the resonator, $\Delta\lambda_{FWHM}$.

In all embodiments, the light to be used as an input for the spectrometer can be collected externally or be already in the chip. External light can come from an external signal source, an optical coherence tomography interferometer, etc. For light that is already in a chip, in applications such as a 'lab on a chip,' an integrated spectrometer is a necessary component.

The disclosure set forth above demonstrates that by sorting resonances from an optical cavity using a wavelength demultiplexer, it is possible to enhance the spectral resolution of the spectrometer. Furthermore, because the spectral resolution of the combined device is decoupled from the resolution of the demultiplexer, the resulting device footprint is significantly reduced, compared to a standard demultiplexer with similar spectral resolution. By serializing devices in time or in space, one can further increase the channel density and effectively cover the entire spectrum of interest.

All references, including publications, patent applications and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. An optical apparatus, comprising:
    an optical resonator filter component having an input, an output, and a through port, and characterized by a free spectral range (FSR), further characterized in that a plurality of input wavelengths over a given bandwidth that are input to the optical resonator filter component are output by the optical resonator filter component as a filtered optical signal comprising a reduced bandwidth wavelength comb having sharp resonances that are matched to the cavity resonances of the optical resonator filter component and separated by the FSR of the optical resonator filter component; and
    a wavelength demultiplexer having an input and a plurality of outputs and characterized by an inherent resolution, wherein the optical resonator filter component output is coupled to the demultiplexer input, further wherein the demultiplexer outputs have broad transmission passbands that are spectrally aligned with the wavelength comb, further wherein the demultiplexer outputs are characterized by a channel spacing that is substantially equal to the FSR such that the optical apparatus has an effective resolution corresponding to a width of the cavity resonances of the optical resonator filter component that is higher than the inherent resolution of the demultiplexer.

2. The apparatus of claim 1, wherein the optical resonator filter component is one of a mirroring resonator, a microdisk resonator, a racetrack resonator, a microtoroidal resonator, and a photonic crystal cavity.

3. The apparatus of claim 1, wherein the demultiplexer comprises a planar grating.

4. The apparatus of claim 3, wherein the planar grating is an echelle grating.

5. The apparatus of claim 3, wherein the planar grating is an arrayed waveguide grating.

6. The apparatus of claim 1, wherein the plurality of demultiplexer outputs are coupled to at least one of an array of optical waveguides and an array of photodetectors.

7. The apparatus of claim 1, wherein the optical resonator filter component is tunable such that the cavity resonances are tunable over the given input wavelength bandwidth.

8. The apparatus of claim 7, wherein the demultiplexer output is characterized by an optical bandwidth that is either approximately equal to the tuning range of the cavity resonances or is tunable over the tuning range of the cavity resonances.

9. The apparatus of claim 1, wherein the apparatus is integrated as a planar photonic circuit on a material platform including one of silicon, indium phosphide, and gallium arsenide.

10. The apparatus of claim 1, further comprising a plurality of the optical apparatuses disposed in serial connection, wherein the through port of the optical resonator filter component of an immediately preceding optical apparatus is coupled to an input of the optical resonator filter component of an immediately succeeding optical apparatus.

11. The apparatus of claim 10, wherein:
    each of the plurality of the optical resonator filters has a substantially similar FSR and a different resonant wavelength, and the channel spacing of each respective wavelength demultiplexer is substantially equal to the FSR of its associated optical resonator filter component; and
    the number of optical apparatus is $FSR/\Delta\lambda$, where $\Delta\lambda$ is the difference in the resonant wavelengths between one optical apparatus and an immediately adjacent optical apparatus.

12. The optical apparatus of claim 9, wherein the effective resolution is equal to or less than 0.001 nm for the optical resonator filter component having a diameter equal to or less than 100 micrometers.

13. An optical apparatus, comprising:
    a wavelength demultiplexer (WDM) characterized by a channel spacing and an inherent resolution, and having an input and a plurality of outputs; and
    a plurality of optical resonator filter components each characterized by a FSR and a plurality of resonance wavelengths, each optical resonator filter component having an input and an output, each resonator filter input being serially coupled to at least a respective WDM output, wherein one different wavelength from the WDM will pass from the resonator filter input to the resonator filter output of each resonator filter component, further wherein the plurality of resonant wavelengths of each resonator filter component are spaced to substantially cover an entire output spectral width of the WDM, further wherein the FSRs of the resonant filter components are substantially equal to or greater than the channel spacing of the WDM, such that the optical apparatus has an effective resolution corresponding to a width of the cavity resonances of the optical resonator filter component that is higher than the inherent resolution of the WDM.

14. The optical apparatus of claim 13, further wherein a plurality of optical resonator filter components are serially coupled to each WDM output.

15. The optical apparatus of claim 13, wherein the optical resonator filter component is one of at least one of a microring resonator, a microdisk resonator, a racetrack resonator, a microtoroidal resonator, and a photonic crystal cavity.

16. The optical apparatus of claim 13, wherein the demultiplexer comprises a planar grating.

17. The optical apparatus of claim 16, wherein the planar grating is an echelle grating.

18. The optical apparatus of claim 16, wherein the planar grating is an arrayed waveguide grating.

19. The apparatus of claim 13, wherein the optical resonator filter component is tunable over a given input wavelength bandwidth.

20. The optical apparatus of claim 13, wherein the apparatus is integrated as a planar photonic circuit on a material platform including one of silicon, indium phosphide, and gallium arsenide.

21. The optical apparatus of claim 13 wherein the FSR of the resonators is equal to or greater than the WDM channel spacing to ensure that only one resonator propagates light at a specific wavelength.

* * * * *

UNITED STATES PATENT AND TRADEMARK OFFICE
CERTIFICATE OF CORRECTION

PATENT NO.        : 9,819,435 B2
APPLICATION NO.   : 13/213666
DATED             : November 14, 2017
INVENTOR(S)       : Michal Lipson et al.

It is certified that error appears in the above-identified patent and that said Letters Patent is hereby corrected as shown below:

In the Claims

Column 9, Line 42, in Claim 2, delete the word "mirroring" and replace it with the word --microring--

Signed and Sealed this
First Day of May, 2018

Andrei Iancu
*Director of the United States Patent and Trademark Office*